J. E. SANDERS.
THRASHING MACHINE.
APPLICATION FILED JAN. 15, 1920.

1,428,911.

Patented Sept. 12, 1922.
3 SHEETS—SHEET 3.

Inventor
J. E. Sanders.

By C. A. Snow & Co.
Attorneys

Patented Sept. 12, 1922.

1,428,911

UNITED STATES PATENT OFFICE.

JAMES E. SANDERS, OF CHATTANOOGA, TENNESSEE.

THRASHING MACHINE.

Application filed January 15, 1920. Serial No. 351,714.

*To all whom it may concern:*

Be it known that I, JAMES E. SANDERS, a citizen of the United States, residing at Chattanooga, in the county of Hamilton and State of Tennessee, have invented a new and useful Thrashing Machine, of which the following is a specification.

This invention relates to improved thrashing machines and bean hulling machines, adapted for separating the beans of various varieties, peas or the like, from their shells, hulls and vines or other foreign matter or chaff.

The primary object of the invention is to improve and generally simplify the construction of thrashing or hulling machines of the above type in which novel means are provided for agitating a sieve for grain by which the device may be regulated to suit different sized grains, and in which novel means are provided for actuating the wind chute or flue, from which the grain will have its progress, in such a manner as to prevent the vines, hulls or other foreign matter or chaff from passing along with the grains.

A further object of the invention is to provide an improved arrangement of cutting blades designed to be employed in the concave and on the cylinder for cooperating therewith, said blades being mounted in a novel manner to permit them to be readily and quickly assembled or replaced, as well as cooperating in such a manner as to insure against breaking of the grains or berries, or otherwise injuring the seeds in the thrashing operation, as distinguished from the breaking and cracking thereof when the ordinary form of teeth are employed.

With the above and other objects in view which will appear as the description proceeds, the invention resides in the combination and arrangment of parts and in the details of construction hereinafter described and claimed, it being understood that, within the scope of what is claimed, changes in the precise embodiment of the invention shown can be made without departing from the spirit of the invention.

Figure 1:
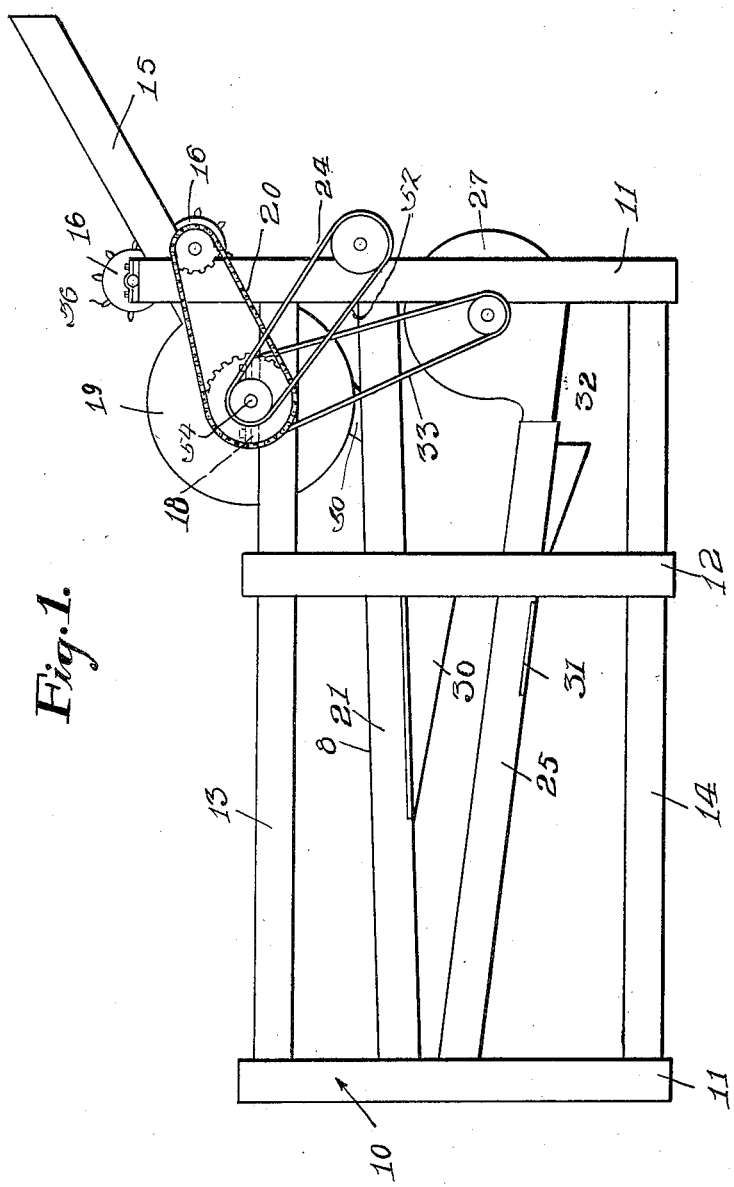
Figure 1 is a side elevation of my improved thrashing machine or bean huller.
Figure 2:
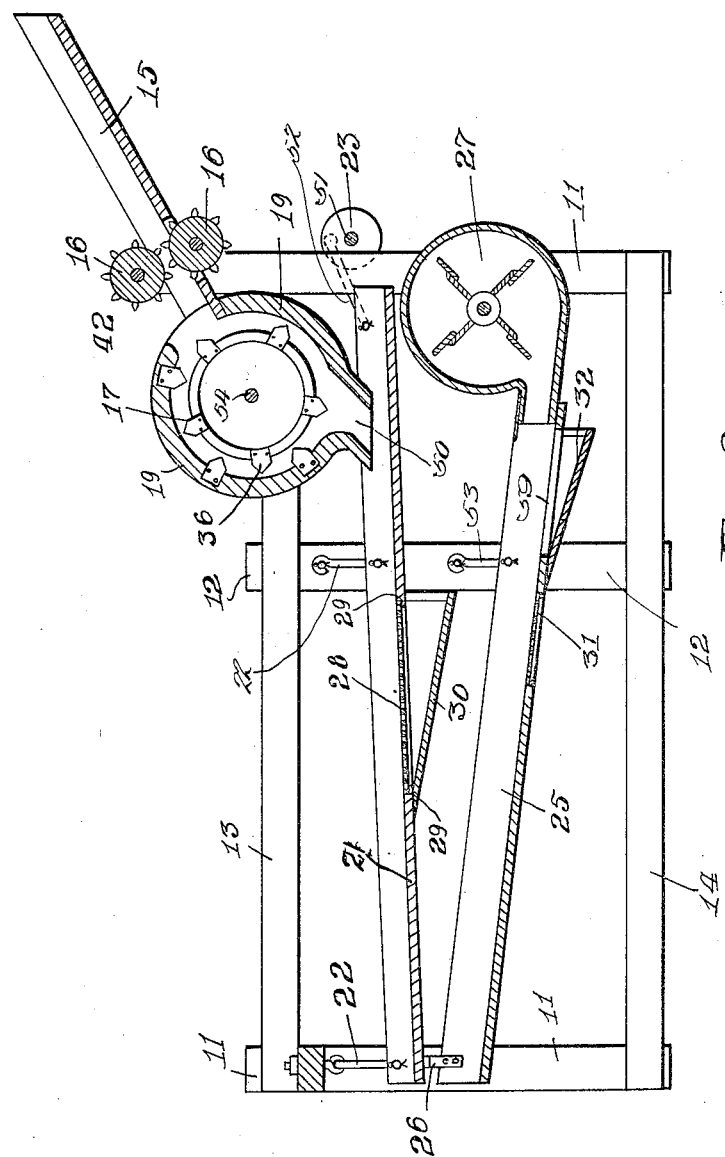
Figure 2 is a central vertical longitudinal sectional view thereof.

Referring to the drawings, 10 designates a supporting frame, preferably of rectangular form when viewed in plan, the same consisting of corner posts 11 and intermediate posts 12 connected by longitudinal upper and lower frame members 13 and 14.

Supported in an inclined position at one end of the frame 10 is a suitable feed device, such as a platform or chute 15.

The grain to be thrashed or hulled, for instance peas, beans, or the like, particularly those of the large varieties, are placed upon the chute 15, from which the same pass between toothed rollers 16 journaled in the chute near the bottom portion thereof, so as to initially separate the hulls from the vines and other foreign matter. The material is then discharged into a cylinder 17 suitably journaled in bearings 18 upon the upper members 13, the cylinder being located within a concave 19 having an outlet 50.

The cylinder 17 may be rotated in any desirable manner, preferably by power and is operatively connected with the rollers 16 by a chain and sprocket drive 20. Arranged in an inclined position below the outlet 50 of the concave 19 is a sieve 21, adapted to be oscillated. The sieve 21 is suspended from the frame 10 by means of hangers 22. The sieve 21 is driven from a shaft 51 by an eccentric 23 and a pitman 52. A belt and pulley connection 24 unites the shaft 51 operatively with the cylinder 17 to the end that the sieve 21 may be oscillated when the cylinder is rotated.

Arranged in an oppositely inclined position beneath the sieve 21 is a wind chute 25, the same being connected by hangers 26 to the sieve 21, so that the chute will reciprocate with the sieve. Hangers 53 support the chute 25 on the frame 10. One end of the chute 25 is slidably mounted on a blow fan 27 adapted to discharge a blast of air over the chute and thus separate from the grain, hulls, or whatever foreign matter has passed from the sieve 21 into the chute.

The sieve 21 is provided with a screen or perforated bottom portion 28, the screen being removably supported, as in guides 29 at the ends thereof, whereby said screen may be taken out readily and a screen of different size, substituted therefor depending upon the kind of grain which is being handled. The grain, passing through the screen 28, is deposited in a guard or chute 30, carried by the sieve 21 and escapes from the end thereof, into the wind chute 25, the hulls and other foreign matter being blown along the chute and separated from the grain as hereinbefore mentioned. The smaller kernels pass through the screen 31, there to be caught in any suitable receptacle. The larger kernels pass through an opening 59 in the chute 25 and move down a chute 32, carried by the member 25 and caught at the end of the chute 32, the kernels graded as the machine is operated.

It is of course to be understood that when the kernels are separated from the hulls, vines and other foreign matter and are discharged from the cylinder 17 of the machine, the kernels will pass through the screen 28 together with such material as is small enough to escape therethrough, while the major portion of the hulls, vines and other foreign matter, will be discharged from the end of the sieve 21, the latter being freely open for this purpose, as is also the chute 25 at its upper or discharged end. Owing to the weight of the kernels, the same will not be affected by the blast of air caused by the blow fan 27. Thus the hulls and other foreign matter will be effectively blown from the kernels to insure a clean product. The blow fan 27 is shown driven from the shaft 54 of the cylinder 17 by a belt 33, it being understood that any suitable speed ratio between the cylinder 17 and the fan 27 may be provided. The rollers 16 will be rotated relatively slowly compared with the speed of rotation of the cylinder 17, while the sieve 21 will be reciprocated slowly the fan 27 being driven relatively fast.

Figure 3:
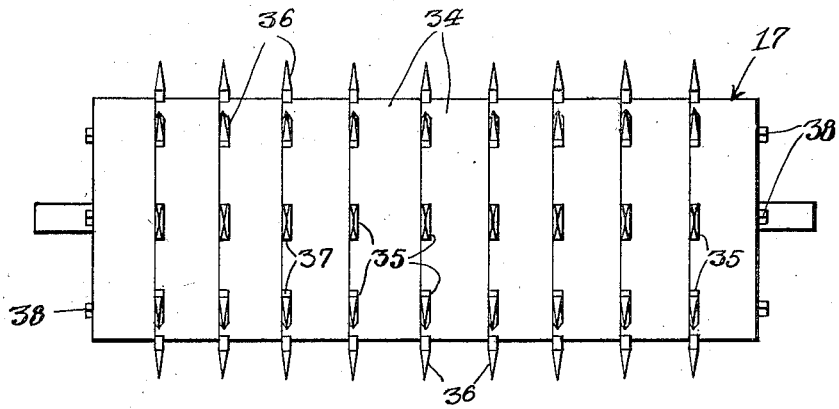
Figure 3 is an enlarged side view of the cylinder, partly in section.
Figure 4:
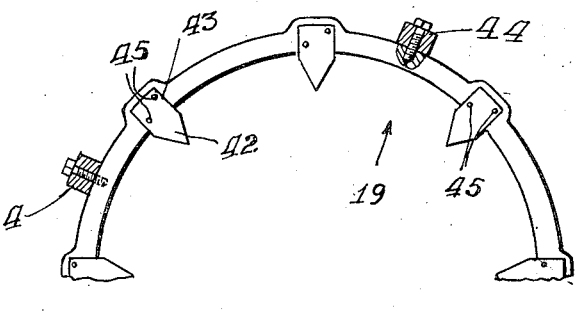
Figure 4 is an enlarged detail sectional view of the concave.
Figure 5:
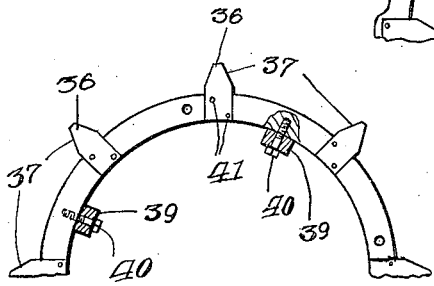
Figure 5 is an enlarged detail sectional view of a cylinder embodying modified construction.

In the construction of the cylinder 17, instead of using teeth as heretofore employed and often injuring the beans in the process of thrashing, I construct the cylinder of a series of sections 34 each section being provided in one side with radial recesses 35 adapted to receive blades 36 arranged edgewise. These blades 36 are preferably provided with oppositely tapered edges 37 and are secured in the sockets or recesses 35 by means of longitudinal connections 38, which serve to assemble the entire cylinder in conjunction with longitudinal reinforcing ribs 39, to which such sections 34 are secured as shown at 40, or as shown in Fig. 5 said blades may be riveted thereto, as indicated at 41. The blades as clearly indicated in Figures 3 and 5 of the drawings, extend radially, their side surfaces being disposed towards the ends of the cylinder at right angles to axis thereof. The blades of the cylinder cooperate with similar blades 42 secured at 54 within the concave 19 and seated in recesses 43 therein. The concave 19 is reinforced by outer ribs or connections 44 to which the sections of the concave are secured as shown at 45. As the blades 36—42 pass by each other during rotation of the cylinder 17, the sharp edges will effectively cut the vines and separate the hulls from the beans or peas, thereby preventing the latter from being cracked or broken, a condition which is unavoidable when recourse is had to teeth such as are employed in thrashing machines. The sections forming the cylinder and the concave, may be made of cast material or otherwise provided that they are secured together and supplied with recesses for receiving and holding the blades in the manner described.

Having thus described the invention what I claim is:

In a device of the class described a frame; a first screen shoe, all portions of which lie in a common plane, the shoe comprising imperforate end portions and a foraminous intermediate portion, the shoe being downwardly inclined toward one end of the frame; means for suspending the shoe from the frame for longitudinal swinging movement; means for imparting longitudinal swinging movement to the shoe; a second screen shoe suspended from the frame and located below the first shoe, the second shoe being downwardly inclined toward the other end of the frame and being provided with a foraminous bottom portion and with an outlet; a blower discharging into the second shoe toward the first specified end of the frame, the outlet being located between the blower and the foraminous bottom portion of the second shoe, one end of the second shoe underriding the blower; means for connecting the second shoe to the first shoe to move therewith; and a guard carried by the first shoe and receiving material from the foraminous intermediate portion of the first shoe, the guard discharging on the second shoe independently of the foraminous bottom portion of the second shoe and being located directly below the foraminous intermediate portion of the first shoe and the foraminous bottom portion of the second shoe, thereby to limit updraft from the blower through the foraminous intermediate portion of the first shoe, and to promote a down draft through the foraminous bottom portion of the second shoe.

In testimony that I claim the foregoing as my own, I have hereto affixed my signature in the presence of two witnesses.

JAMES E. SANDERS.

Witnesses:
T. H. WAGNER,
WILL J. WATSON.